(12) United States Patent
Kim

(10) Patent No.: US 12,459,558 B2
(45) Date of Patent: Nov. 4, 2025

(54) STEERING APPARATUS AND ASSEMBLY METHOD THEREOF

(71) Applicant: HL Mando Corporation, Pyeongtaek-si (KR)

(72) Inventor: Tae Sik Kim, Yongin-si (KR)

(73) Assignee: HL MANDO CORPORATION, Pyeongtaek-si (KR)

( * ) Notice: Subject to any disclaimer, the term of this patent is extended or adjusted under 35 U.S.C. 154(b) by 801 days.

(21) Appl. No.: 17/698,333

(22) Filed: Mar. 18, 2022

(65) Prior Publication Data

US 2022/0306185 A1      Sep. 29, 2022

(30) Foreign Application Priority Data

Mar. 25, 2021   (KR) ................ 10-2021-0038579

(51) Int. Cl.
*B62D 5/04*          (2006.01)
*F16H 1/22*          (2006.01)

(52) U.S. Cl.
CPC ......... *B62D 5/0454* (2013.01); *B62D 5/0421* (2013.01); *B62D 5/0445* (2013.01); *F16H 1/225* (2013.01)

(58) Field of Classification Search
CPC ....... B62D 5/0454; B62D 5/0445; F16H 1/22; F16H 1/222; F16H 1/225
See application file for complete search history.

(56) References Cited

U.S. PATENT DOCUMENTS

| 272,940 A * | 2/1883 | Bergh ................ F16H 55/18 |
| | | 403/295 |
| 10,647,346 B2 * | 5/2020 | Cai ................ F16H 25/205 |

FOREIGN PATENT DOCUMENTS

| CN | 101700786 A | * | 5/2010 |
| CN | 108691955 A | * | 10/2018 |
| JP | 07172326 A | * | 7/1995 |
| JP | H8-258728 A | | 10/1996 |
| JP | 2006232183 A | * | 9/2006 |
| KR | 10-2013-0098815 A | | 9/2013 |
| KR | 10-2017-0133239 A | | 12/2017 |

OTHER PUBLICATIONS

Office Action dated Feb. 7, 2025 for corresponding Korean Patent Application No. 10-2021-0038579, along with an English machine translation (8 pages).
Korean Notice of Allowance issued on Sep. 10, 2025, for corresponding Korean Patent Application No. 10-2021-0038579, with its English translation, 3 pages.

* cited by examiner

*Primary Examiner* — William C Joyce

(74) *Attorney, Agent, or Firm* — Hauptman Ham, LLP

(57) ABSTRACT

A steering apparatus includes a first reducer having a first worm coupled to a first motor and a first worm wheel which rotates by being meshed with the first worm; a second reducer having a second worm coupled to a second motor and a second worm wheel which rotates by being meshed with the second worm; and a screw shaft on which the first reducer is mounted on one side and the second reducer is mounted on the other side, wherein an angle at which the first reducer and the second reducer are mounted to the screw shaft is set to an offset angle. The steering apparatus is capable of reducing the fluctuation range of torque ripple in using a double motor and double reducer structure, thereby relieving a fatigue and discomfort of a driver.

11 Claims, 9 Drawing Sheets

FIG.6

| Gear dimension of worm wheel | 28 | 30 | 33 | 37 | 41 | 45 | 49 |
|---|---|---|---|---|---|---|---|
| Offset angle | 6.43 | 6.00 | 5.45 | 4.86 | 4.39 | 4.00 | 3.67 |

STEERING APPARATUS AND ASSEMBLY METHOD THEREOF

CROSS REFERENCE TO RELATED APPLICATION

This application claims priority from Korean Patent Application No. 10-2021-0038579, filed on Mar. 25, 2021, which is hereby incorporated by reference for all purposes as if fully set forth herein.

TECHNICAL FIELD

Embodiments of the present disclosure relate to a steering apparatus and an assembly method of the same.

BACKGROUND

In general, a steering apparatus of a vehicle is an apparatus for changing the traveling direction of a vehicle as the intension of a driver, and which assists in moving the vehicle by changing the rotational center around which the wheels of the vehicle turn in the direction desired by the driver.

In general, a steering apparatus may utilize a device for transmitting a steering assistance force to a steering mechanism using a torque sensor, a motor, and a reducer. Recently, in preparation for abnormal operation or failure of any one device, there has been used a double motor and a double reducer structure in which each driving force generated by two motors is transmitted to a steering mechanism through two reducers.

However, in the steering apparatus, when a motor rotates a motor shaft, there may be generated a vibration in the rotation direction of the motor shaft in addition to a torque ripple due to a sudden change in torque, and the vibration and torque ripple may cause fatigue and discomfort to the driver. In particular, in a steering apparatus having a dual motor and a dual reducer structure, the fluctuation range of torque ripple may be doubled compared to a case of one motor, thereby causing a feeling of fatigue and discomfort to the driver.

SUMMARY

Embodiments of the present disclosure provide a steering apparatus and an assembly method of the same capable of reducing a fluctuation range of torque ripple caused by sudden change in torque, thereby relieving a fatigue and discomfort of a driver in a steering apparatus of the double motor and double reducer structure.

In an aspect of the present disclosure, the present embodiments may provide a steering apparatus including a first reducer comprising a first worm coupled to a first motor and a first worm wheel which rotates by being meshed with the first worm, a second reducer comprising a second worm coupled to a second motor and a second worm wheel which rotates by being meshed with the second worm, and a screw shaft on which the first reducer is mounted on one side and the second reducer is mounted on the other side, wherein an angle at which the first reducer and the second reducer are mounted to the screw shaft is set to a preset offset angle.

In another aspect of the present disclosure, the present embodiments may provide an assembly method of a steering apparatus including determining an offset angle at which first reducer including a first worm coupled to a first motor and a first worm wheel meshing with the first worm to rotate and second reducer including a second worm coupled to a second motor and a second worm wheel meshed with the second worm to rotate are to be mounted on a screw shaft, and mounting the first reducer and the second reducer on one side and the other side of the screw shaft according to the offset angle.

According to embodiments of the present disclosure, in a steering apparatus having a dual motor and a dual reducer structure, it is possible to provide a steering apparatus capable of reducing the fluctuation range of torque ripple due to a sudden change in torque, thereby relieving a driver's fatigue and discomfort, and an assembly method thereof.

BRIEF DESCRIPTION OF THE DRAWINGS

FIG. 6 is a table illustrating an offset angle according to a gear dimension of a worm wheel according to the present embodiments.

DETAILED DESCRIPTION

Figure 1:
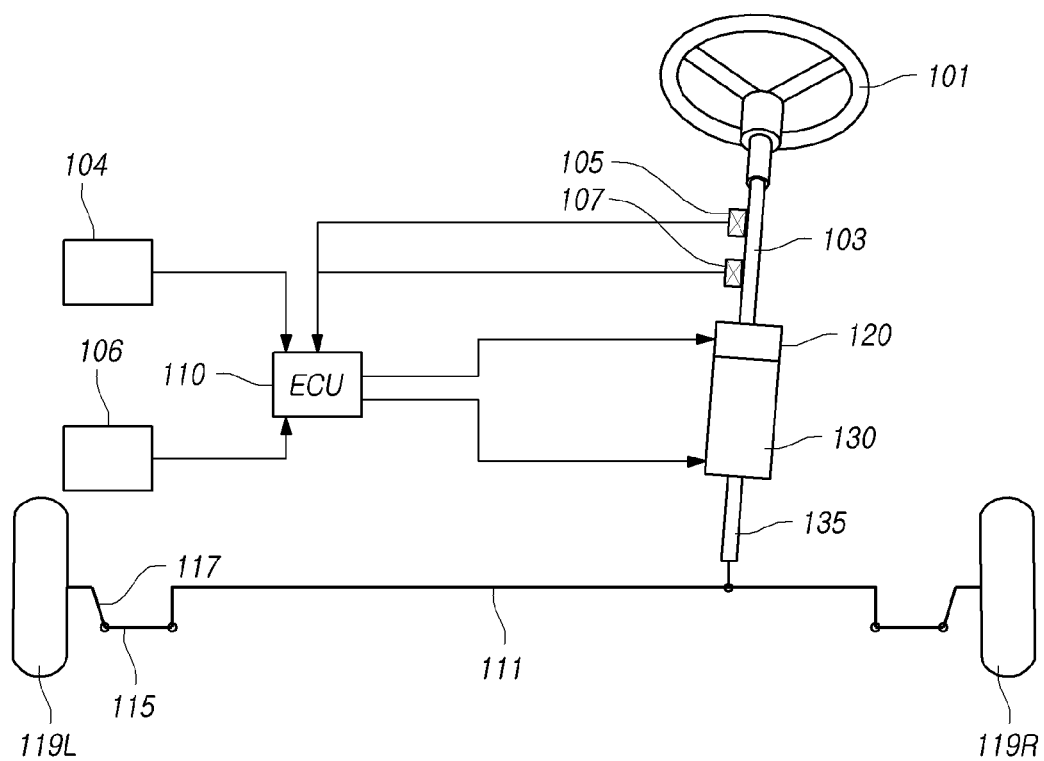
FIG. 1 is a schematic diagram illustrating a steering apparatus according to the present embodiments.

In the following description of examples or embodiments of the present disclosure, reference will be made to the accompanying drawings in which it is shown by way of illustration specific examples or embodiments that can be implemented, and in which the same reference numerals and signs can be used to designate the same or like components even when they are shown in different accompanying drawings from one another. Further, in the following description of examples or embodiments of the present disclosure, detailed descriptions of well-known functions and components incorporated herein will be omitted when it is determined that the description may make the subject matter in some embodiments of the present disclosure rather unclear. The terms such as "including", "having", "containing", "constituting" "make up of", and "formed of" used herein are generally intended to allow other components to be added unless the terms are used with the term "only". As used herein, singular forms are intended to include plural forms unless the context clearly indicates otherwise.

Terms, such as "first", "second", "A", "B", "(A)", or "(B)" may be used herein to describe elements of the disclosure. Each of these terms is not used to define essence, order, sequence, or number of elements etc., but is used merely to distinguish the corresponding element from other elements.

When it is mentioned that a first element "is connected or coupled to", "contacts or overlaps" etc. a second element, it should be interpreted that, not only can the first element "be directly connected or coupled to" or "directly contact or overlap" the second element, but a third element can also be "interposed" between the first and second elements, or the first and second elements can "be connected or coupled to", "contact or overlap", etc. each other via a fourth element. Here, the second element may be included in at least one of two or more elements that "are connected or coupled to", "contact or overlap", etc. each other.

When time relative terms, such as "after," "subsequent to," "next," "before," and the like, are used to describe processes or operations of elements or configurations, or flows or steps in operating, processing, manufacturing methods, these terms may be used to describe non-consecutive or non-sequential processes or operations unless the term "directly" or "immediately" is used together.

In addition, when any dimensions, relative sizes etc. are mentioned, it should be considered that numerical values for an elements or features, or corresponding information (e.g., level, range, etc.) include a tolerance or error range that may be caused by various factors (e.g., process factors, internal or external impact, noise, etc.) even when a relevant description is not specified. Further, the term "may" fully encompasses all the meanings of the term "can".

FIG. 1 is a schematic diagram illustrating a steering apparatus according to the present embodiments.

Referring to FIG. 1, in a steering apparatus according to the present embodiments, an angle sensor 105 and a torque sensor 107 are coupled to one side of a steering shaft 103 connected to a steering wheel 101. The angle sensor 105 and the torque sensor 107 detect the driver's manipulation of the steering wheel 101 and transmit the detected electric signal to an electronic control device. The electronic control device 110 transmits an operation signal for controlling an operation to a driving motor 120 (hereinafter, the driving motor is referred to as a motor) based on the electric signal received from the angle sensor 105 and the torque sensor 107.

The electronic control device 110 may control the motor 120 based on electrical signals transmitted from various sensors mounted on a vehicle, such as a vehicle speed sensor 104 and a motor rotation angle sensor 106 in addition to the electric signal transmitted from the angle sensor 105 and the torque sensor 107.

However, for convenience of explanation, FIG. 1 illustrates a case in which the angle sensor 105, the torque sensor 107, the vehicle speed sensor 104 and the motor rotation angle sensor 106 are provided, but is not limited thereto. For example, the vehicle may further include a motor position sensor for transmitting steering information to the electronic control device 110 and various sensors such as radar, a lidar, camera image sensors, and the like.

The motor 120 operates a pitman aim 135 connected to a sector shaft through a reducer 130, and a link 111 connected to the pitman arm 135 performs a steering of both wheels 119L and 119R through links 115 and 117 connected to both wheels 119L and 119R.

Figure 2:
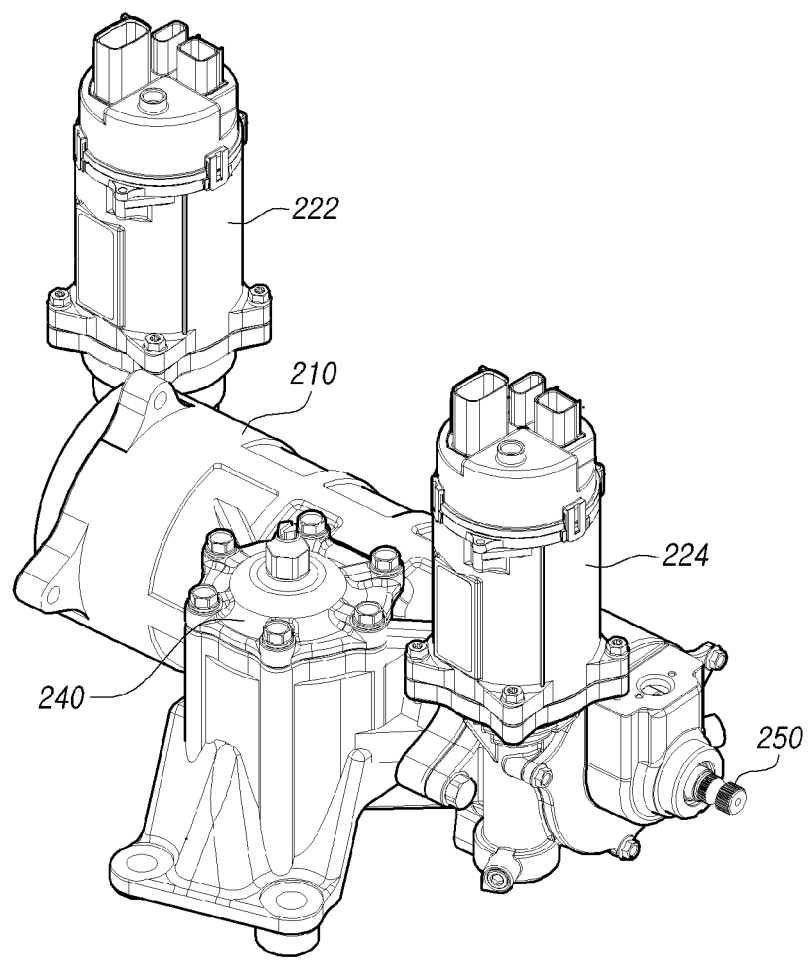
FIG. 2 is a perspective diagram illustrating a part of a steering apparatus according to the present embodiments.
Figure 3:
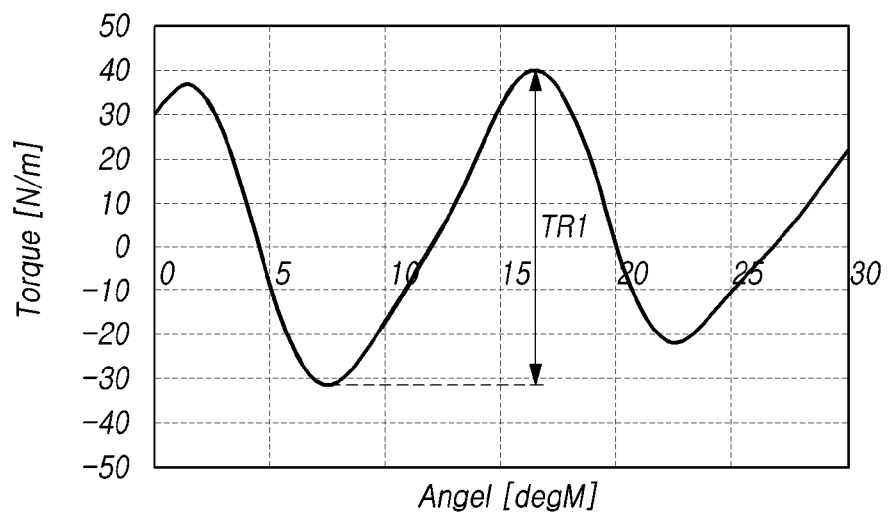
FIG. 3 is a graph illustrating torque ripple of a steering apparatus in which a first reducer and a second reducer are mounted to a screw shaft at the same angle according to the present embodiments.

FIG. 2 is a perspective diagram illustrating a part of a steering apparatus according to the present embodiments, and FIG. 3 is a graph illustrating torque ripple of a steering apparatus in which a first reducer and a second reducer are mounted to a screw shaft at the same angle according to the present embodiments.

Referring to FIG. 2, a screw shaft is provided inside a housing 210, a first reducer coupled to a first motor 222 is mounted on one side of the screw shaft, and a second reducer coupled to a second motor 224 is mounted on the other side of the screw shaft. The first and second reducers receiving a driving force from each of the first motor 222 and the second motor 224 may rotate the screw shaft, and a sector shaft 240 may operate according to the rotation of the screw shaft.

An input shaft 250 is connected to the steering shaft (103 in FIG. 1), and is rotated by the first and second reducers connected to the first motor 222 and the second motor 224.

The input shaft 250 may be connected to the steering shaft (103 in FIG. 1) or be replaced by the steering shaft (103 in FIG. 1). That is, depending on the engine room layout of the vehicle, if the steering shaft (103 in FIG. 1) is provided by being bent with a universal joint, etc., the steering shaft (103 in FIG. 1) may be connected to the input shaft 250. In addition, in the case that the steering shaft (103 of FIG. 1) is integrally provided, the steering shaft (103 of FIG. 1) may be the input shaft 250.

The electronic control device (110 in FIG. 1) may simultaneously control the first motor 222 and the second motor 224 based on electrical signals received from the angle sensor (105 in FIG. 1) and the torque sensor (107 in FIG. 1) and electrical signals transmitted from the vehicle speed sensor (104 in FIG. 1), the wheel rotation angle sensor (106 in FIG. 1), etc.

One electronic control device (110 in FIG. 1) for controlling the first motor 222 and the second motor 224 may be provided, but is not limited thereto. For example, the electronic control device (110 in FIG. 1) may be provided in two devices, and if one device fails, the other device may control the first motor 222 and the second motor 224.

In general, the first reducer coupled to the first motor 222 mounted on the screw shaft and the second reducer coupled to the second motor 224 may be is mounted at the same angle. Accordingly, a gear meshing frequency of the first reducer and a gear meshing frequency of the second reducer may coincide with each other.

As shown in FIG. 3, if the gear meshing frequency of the first reducer and the gear meshing frequency of the second reducer coincide, a fluctuation range TR1 of the torque ripple transmitted to the screw shaft may have a large value, and as a result, the driver may feel fatigued and uncomfortable.

Hereinafter, it will be described a steering apparatus capable of reducing the fluctuation range of the torque ripple transmitted to the screw shaft according to the present embodiments, thereby resolving the driver's fatigue and discomfort with reference to the drawings.

Figure 4:
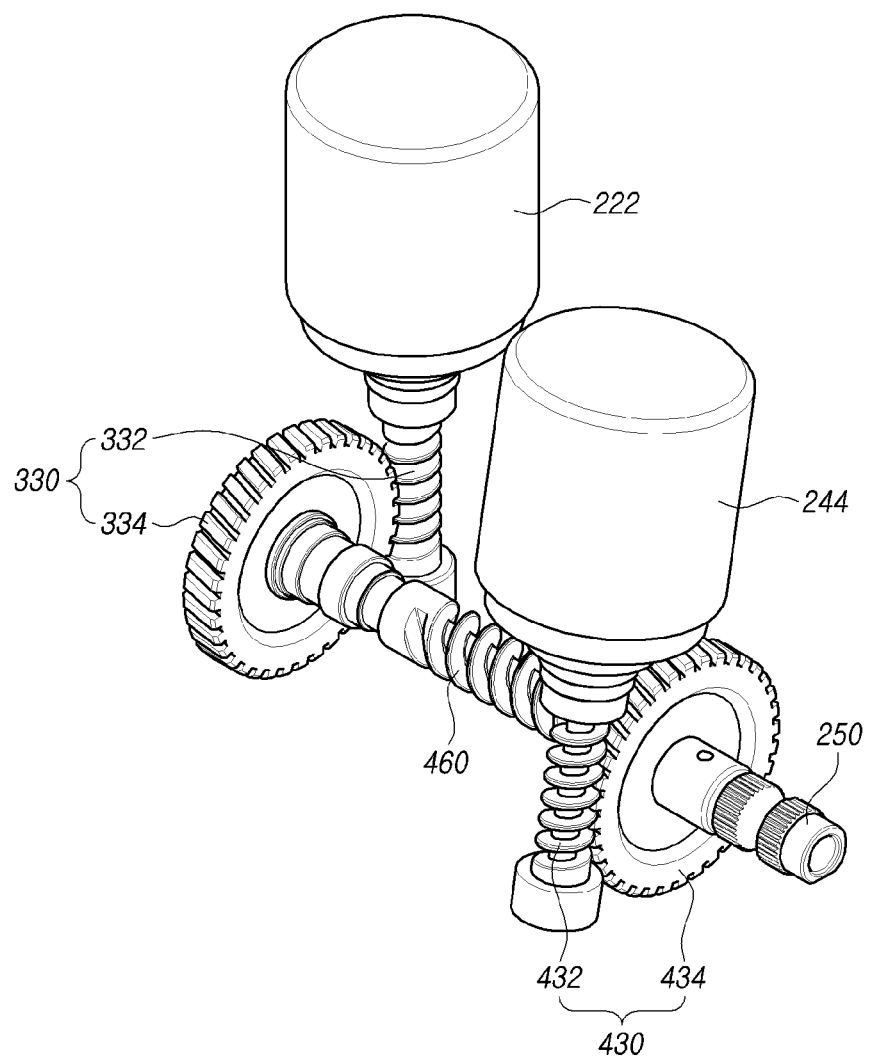
FIG. 4 is a perspective diagram illustrating a part of a steering apparatus according to the present embodiments.

FIG. 4 is a perspective diagram illustrating a part of a steering apparatus according to the present embodiments.

Referring to FIG. 4, the steering apparatus according to the present embodiments may include a first reducer 330, a second reducer 430 and a screw shaft 460.

The first reducer 330 may include a first worm 322 coupled to the first motor 222 and a first worm wheel 334 which is meshed with the first worm 322 to rotate. In addition, the second reducer 430 may include a second worm 432 coupled to the second motor 224 and a worm wheel 434 that is meshed with the second worm and rotates.

The first reducer 330 is mounted on one side of the screw shaft 460, and a second reducer 430 is mounted on the other side. The screw shaft 460 receives the driving force of the first motor 222 and the second motor 233 through the first reducer 330 and the second reducer 430, respectively. The screw shaft 460 is rotated by the received driving force, and the rotation of the screw shaft 460 operates a sector shaft to transfer the steering force to the wheel.

The first reducer 330 and the second reducer 430 are mounted on one side and the other side of the screw shaft 460, respectively, so that the driving force of the motor can be transmitted from both sides, thereby providing a stable steering feeling.

The angle at which the first reducer 330 and the second reducer 430 are mounted to the screw shaft 460 may be configured as a preset offset angle. Here, the offset angle may be an angle between a center of a tooth groove between two adjacent gear teeth of the first worm 334 wheel and a center of a tooth groove of the second worm wheel 434 provided in an area opposite to one of the two adjacent gear teeth, with respect to an axis of the screw shaft 460.

That is, the offset angle may mean any angle in which a center of the tooth groove provided in the first worm wheel 334 does not coincide with a center of the tooth groove provided in the second worm wheel 434. Accordingly, the first worm wheel 334 and the second worm wheel 434 which transmit the driving force of the motor to the screw shaft 460 do not simultaneously mesh with the first worm 322 and the second worm 432, respectively. Accordingly, it is possible to prevent the gear meshing frequency of the first reducer from matching the gear meshing frequency of the second reducer.

The offset angle may be determined based on a gear dimension of the first worm wheel 334 or a gear dimension of the second worm wheel 434. For example, the offset angle may be determined by multiplying a value obtained by dividing a first constant by the gear dimension of the first worm wheel 334 or the gear dimension of the second worm wheel 434 by a second constant. Specifically, the first constant may be 360, and the second constant may be 0.5.

The steering apparatus may further include a sector shaft (240 in FIG. 2) connected to the screw shaft 460 and rotating according to the rotation of the screw shaft 460. The Pitman arm (135 in FIG. 1) is operated by rotation of the sector shaft (240 in FIG. 2), and thus steering may be performed.

The steering apparatus according to the present embodiments may reduce the fluctuation range of the torque ripple when using the dual motor and the double reducer structure, thereby deducing a fatigue and discomfort transmitted to the driver.

Hereinafter, it will be described more various embodiments of the above-described steering apparatus with reference to the drawings.

Figure 5:
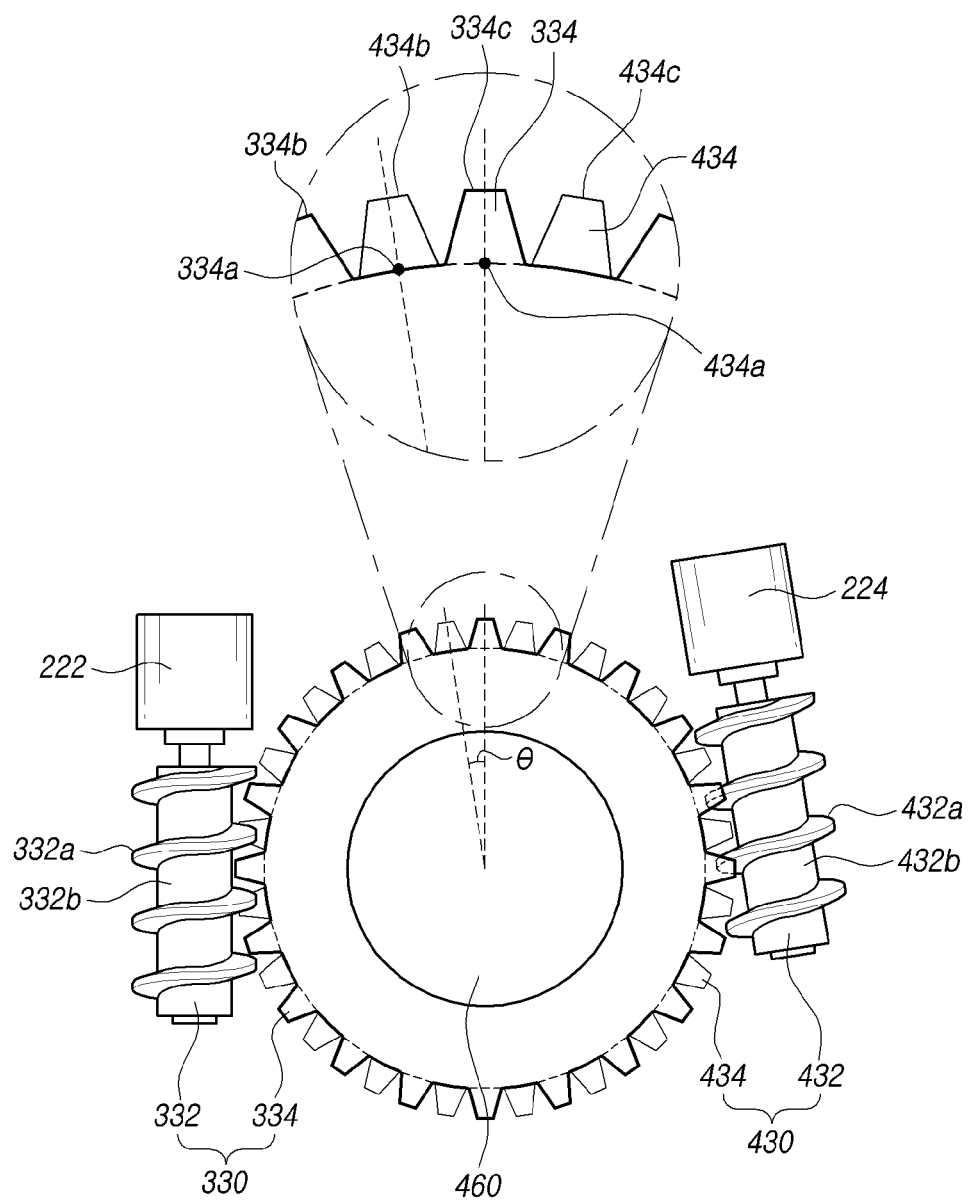
FIG. 5 is a side view illustrating a part of a steering apparatus according to the present embodiments.

FIG. 5 is a side view illustrating a part of a steering apparatus according to the present embodiments.

Referring to FIG. 5, the first reducer 330 may include a first worm 332 driven by the first motor 222 and a first worm wheel 334 that is meshed with the first worm 332 and rotates, and the second reducer 430 may include a second worm 432 driven by the second motor 224 and a second worm wheel 434 meshed with the second worm 432 to rotate.

The first motor 222 and the second motor 224 may be independently controlled by an electronic control device (110 in FIG. 1). In this case, the first worm 332 coupled with the first motor 222 and the second worm 432 coupled with the second motor 224 may operate independently. Accordingly, it is possible to precisely control the rotation of the first worm wheel 334 and the second worm wheel 434.

In addition, if any one of the first motor 222 and the second motor 224 is unable to operate due to abnormal operation or failure while the vehicle is driving, it is possible to compensate the insufficient or required output with the other to transmit a stable steering force. That is, it is possible to secure safety performance through fail safety or redundancy.

The first worm 332 and the second worm 432 may be provided with threaded portions 332a, 332b, 432a, 432b on the outer peripheral surface of the shaft, respectively. In the threaded portions 332a, 332b, 432a, and 432b, the peaks 332a, 432a and the valleys 332b, 432b alternate, and as the first worm 332 and the second worm 432 rotate, the peaks 332a and 432a of the threaded portion are engaged with the tooth grooves 343a and 434a between the gear teeth provided on each of the first worm wheel 334 and the second worm wheel 434 to rotate the first worm wheel 334 and the second worm wheel 434.

As shown in FIG. 5, the offset angle θ may be an angle between a center of a tooth groove 334a between two adjacent gear teeth 334b and 334c of the first worm 334 wheel and a center of a tooth groove 434a of the second worm wheel 434 provided in an area opposite to one of the two adjacent gear teeth, with respect to an axis of the screw shaft 460.

The first worm wheel 334 may be provided with a first tooth groove 334a between the first gear tooth 334b and the second gear tooth 334c. The second worm wheel 434 is provided with a second tooth groove 434a in an area opposite to the second gear tooth 334c, and on both sides of the second tooth groove 434a, a third gear tooth 434b and a fourth gear tooth 434c may be provided.

The offset angle θ may be an angle between the center of the first tooth groove 334a of the first worm wheel 334 and the center of the second tooth groove 434a of the second worm wheel 434, with respect to the axis of the screw shaft 460. That is, the offset angle θ may mean an angle at which the center of the first tooth groove 334a of the first worm wheel 334 and the center of the second tooth groove 434a of the second worm wheel 434 do not coincide. Accordingly, each of the tooth grooves provided on the first worm wheel 334 and the tooth grooves provided on the second worm wheel 434 may not simultaneously mesh with the peaks 332a and 432a of the threaded portions 332a, 332b, 432a, 432b provided in each of the first worm 332 and the second worm 432, respectively. Therefore, it is possible to prevent the gear meshing frequency of the first reducer 330 including the first worm 332 and the first worm wheel 334 from matching the gear meshing frequency of the second reducer 430 including the second worm 432 and the second worm wheel 434.

FIG. 6 is a table illustrating an offset angle according to a gear dimension of a worm wheel according to the present embodiments.

Referring to FIG. 6, the offset angle may be determined based on the gear dimension of the first worm wheel or the gear dimension of the second worm wheel.

The gear dimension of the first worm wheel and the gear dimension of the second worm wheel may mean the number of gear teeth 334b and 334c of the first worm wheel 334 and the number of the gear teeth 434b and 434c of the second worm wheel 434 of FIG. 5. Although the gear dimension of the first worm wheel and the gear dimension of the second worm wheel may be different, the gear dimension of the first worm wheel and the gear dimension of the second worm wheel may be the same in consideration of easy reduction ratio control. In this case, the offset angle may be determined by any one of the gear dimension of the first worm wheel and the gear dimension of the second worm wheel. Hereinafter, it will be described a case in which the gear dimension of the first worm wheel and the gear dimension of the second worm wheel are the same, and the offset angle is determined according to the gear dimension of the first worm wheel.

Referring to FIG. 6, the offset angle may be determined by a table value experimentally obtained according to the gear dimension of the first worm wheel. For example, if the gear dimension of the first worm wheel is 33, the offset angle is 5.45 degrees, in the case that the gear dimension of the first worm wheel is 37, the offset angle is 4.86, in the case the gear dimension of the first worm wheel is 41, the offset angle may be determined as 4.39 degrees.

As described above, the offset angle may be determined by an experimentally obtained table value, but is not limited thereto. For example, the offset angle may be determined by multiplying a value obtained by dividing the first constant by the gear dimension of the first worm wheel or the gear dimension of the second worm wheel by the second constant. Specifically, the first constant may be 360, and the second constant may be 0.5. That is, the offset angle may be calculated and determined by the following equation.

$$\text{Offset angle } (\theta) = (360/\text{gear dimension of worm wheel})*0.5 \quad \text{[Equation]}$$

As described above, the gear dimension of the first worm wheel and the gear dimension of the second worm wheel are provided to be the same, and the offset angle may be determined by the above formula according to one of the gear dimensions. For example, if the gear dimension of the first worm wheel is 36, the offset angle may be determined as 5 degrees calculated by multiplying the value obtained by dividing 360 by 36, which is the gear dimension of the first worm wheel, by 0.5 by the above equation. As another example, if the gear dimension of the first worm wheel is 40, the offset angle may be determined as 4.5 degrees calculated by multiplying the value obtained by dividing 360 by 40, which is the gear dimension of the first worm wheel, by 0.5 by the above equation.

If the gear dimension of the first worm wheel and the gear dimension of the second worm wheel are provided to be equal to 36, the offset angle may be determined by 5 degrees by the above equation. In this case, the first worm wheel and the second worm wheel may be mounted on the screw shaft such that the angle between the center of the first tooth groove of the first worm wheel and the center of the second tooth groove of the second worm wheel is 0.5 with respect to the axis of the screw shaft.

In addition to the gear dimensions of the worm wheel described in the table values of FIG. 6, by the gear dimensions of the worm wheels which are not described in the table values of FIG. 6, the offset angle may be calculated and determined by the above equation.

The offset angle determined by the above table value or the above-mentioned equation may be a mounting angle between the first reducer and the second reducer capable of preventing a meshing frequency of the first reducer from matching a meshing frequency of the second reducer, as well as minimizing mutual interference therebetween. Accordingly, it is possible to reduce the fluctuation range of the torque ripple in using the dual motor and the double reducer structure.

Figure 7:
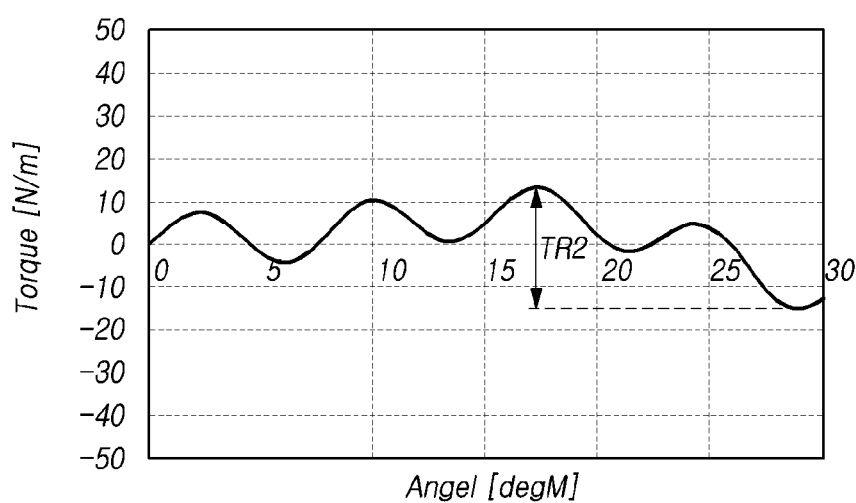
FIG. 7 is a graph illustrating a torque ripple of a steering apparatus in which a first reducer and a second reducer are mounted to a screw shaft at a preset offset angle according to the present embodiments.

FIG. 7 is a graph illustrating a torque ripple of a steering apparatus in which a first reducer and a second reducer are mounted to a screw shaft at a preset offset angle according to the present embodiments.

Comparing FIG. 7 with FIG. 3, there may be identified that the fluctuation range TR1 and TR2 of the torque ripple are reduced. For example, if the first reducer and the second reducer are mounted on the screw shaft at the same angle, the fluctuation range TR1 of the torque ripple may be about 70 mNm as shown in FIG. 3. Meanwhile, if the first reducer and the second reducer are mounted on the screw shaft at a preset offset angle, the fluctuation range TR2 of the torque ripple may be about 30 mNm as shown in FIG. 7.

In FIG. 7, the fluctuation range TR2 of the torque ripple is illustrated to be about 30 mNm, but it is not limited thereto, and the fluctuation range TR2 of the torque ripple may have a value smaller than 30 mNm, and the fluctuation range TR2 of the torque ripple may have a value close to 0 mN depending on the operating environment, thereby improving the steering feeling of a driver.

Figure 8:
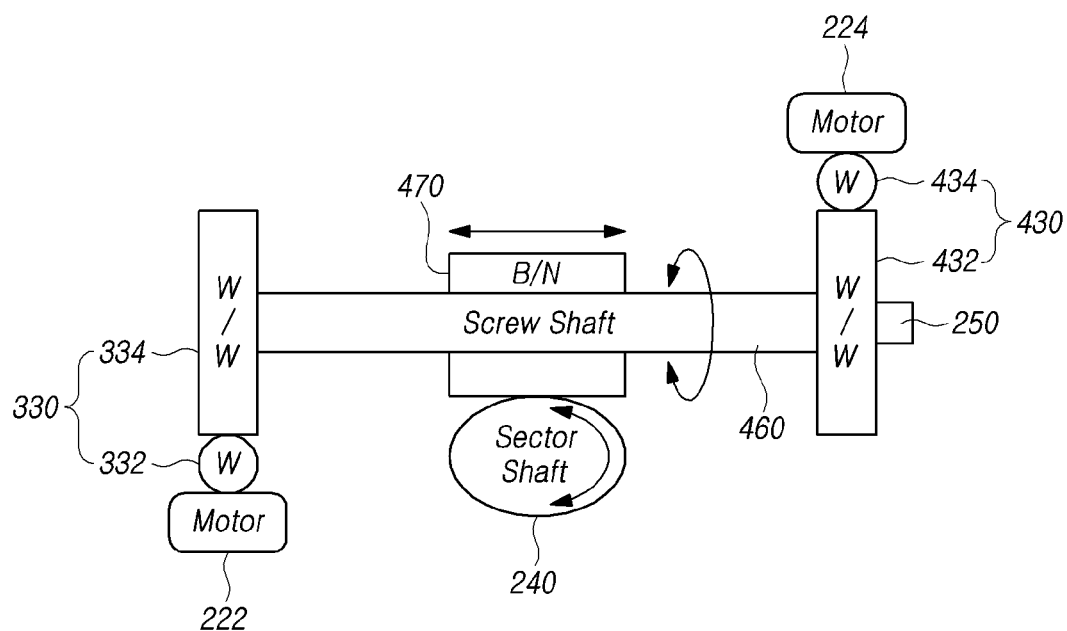
FIG. 8 is a cross-sectional view schematically illustrating a part of a steering apparatus according to the present embodiments.

FIG. 8 is a cross-sectional view schematically illustrating a part of a steering apparatus according to the present embodiments.

Referring to FIG. 8, the steering apparatus may further include a sector shaft 240 which is connected to the screw shaft 460 and rotates according to the rotation of the screw shaft 460.

The screw shaft 460 may include has an outer circumferential screw groove formed on the outer circumferential surface, and a ball nut 470 coupled to the screw shaft 460 through a ball may have an inner circumferential screw groove corresponding to the outer circumferential screw groove of the screw shaft 460 on the inner circumferential surface. Accordingly, as the screw shaft 460 rotates, the ball nut 470 may slide in the axial direction.

In addition, gear teeth are foamed on the outer circumferential surface of the ball nut 470, so that the gear teeth meshed therewith rotate the sector shaft 240 formed on one side of the outer circumferential surface.

Accordingly, as the ball nut 470 slides in the axial direction, the sector shaft 240 rotates while operating the pitman arm (135 in FIG. 1) to transmit steering force.

In the case that the first reducer 330 and the second reducer 430 are mounted on the screw shaft 460 at a preset offset angle, the fluctuation range of the torque ripple can be reduced, so that the rotational force may be stably transmitted to the screw shaft 460, and accordingly, there may be performed a stable steering through the sector shaft 240.

The steering apparatus according to the present embodiments may prevent the gear meshing frequencies of the reducers from matching when using the dual motor and the double reducer structure, thereby reducing the fluctuation range of the torque ripple and relieving the fatigue and discomfort of the driver.

Hereinafter, it will be described an assembly method of the steering apparatus described with reference to FIGS. 1 to 8.

Figure 9:
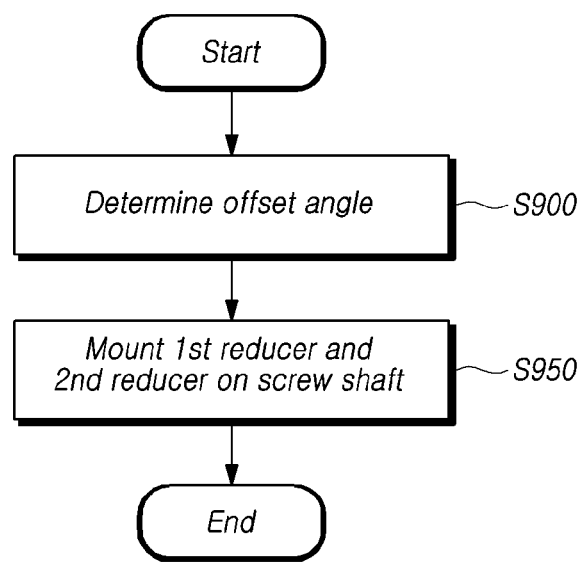
FIG. 9 is a flowchart illustrating an assembly method of a steering apparatus according to the present embodiments.

FIG. 9 is a flowchart illustrating an assembly method of a steering apparatus according to the present embodiments.

Referring to FIG. 9, an assembly method of the steering apparatus may include determining an offset angle at which a first reducer coupled to a first motor and a second reducer coupled to a second motor should be mounted on a screw shaft (S900), and mounting the first reducer and the second reducer on one side and the other side of the screw shaft according to the offset angle (S950).

The first reducer and the second reducer may be worm-worm wheel gear structure. For example, the first reducer may include a first worm driven by the first motor and a first worm wheel that is meshed with the first worm to rotate. In addition, the second reducer may include a second worm driven by the second motor and a second worm wheel that is meshed with the second worm to rotate.

The first reducer is mounted on one side of the screw shaft, and the second reducer is mounted on the other side of the screw shaft. The screw shaft receives the driving force of the first motor and the second motor through the first reducer and the second reducer, respectively. The screw shaft rotates by the received driving force, and the rotation of the screw shaft operates a sector shaft to transmit the steering force to the wheels.

The first reducer and the second reducer are mounted on one side and the other side of the screw shaft, respectively, so that the driving force of the motor can be transmitted from both sides, thereby providing the stable steering feeling.

The determining the offset angle (S900) may include determining an angle formed when each of the first reducer and the second reducer is mounted on the screw shaft.

The offset angle at which the first reducer and the second reducer are to be mounted on the screw shaft may be an angle between a center of a tooth groove between two adjacent gear teeth of the first worm wheel and a center of a tooth groove of the second worm wheel provided in an area opposite to one of the two adjacent gear teeth, with respect to an axis of the screw shaft.

The offset angle may be determined based on a gear dimension of the first worm wheel or a gear dimension of the second worm wheel. For example, the offset angle may be determined by multiplying a value obtained by dividing a first constant by the gear dimension of the first worm wheel or the gear dimension of the second worm wheel by a second constant. Specifically, the first constant may be 360, and the second constant may be 0.5.

If the offset angle is determined, there may be performed the step (S950) of mounting the first reducer and the second reducer to one side and the other side of the screw shaft according to the offset angle.

According to the assembly method of the steering apparatus according to the present embodiments, in the dual motor and the dual reducer structure, it is possible to relieve the fatigue and discomfort of a driver by reducing the fluctuation range of torque ripple.

The above description has been presented to enable any person skilled in the art to make and use the technical idea of the present disclosure, and has been provided in the context of a particular application and its requirements. Various modifications, additions and substitutions to the described embodiments will be readily apparent to those skilled in the art, and the general principles defined herein may be applied to other embodiments and applications without departing from the spirit and scope of the present disclosure. The above description and the accompanying drawings provide an example of the technical idea of the present disclosure for illustrative purposes only. That is, the disclosed embodiments are intended to illustrate the scope of the technical idea of the present disclosure. Thus, the scope of the present disclosure is not limited to the embodiments shown, but is to be accorded the widest scope consistent with the claims. The scope of protection of the present disclosure should be construed based on the following claims, and all technical ideas within the scope of equivalents thereof should be construed as being included within the scope of the present disclosure.

What is claimed is:

1. A steering apparatus comprising:
   a first reducer comprising a first worm coupled to a first motor and a first worm wheel which rotates by being meshed with the first worm;
   a second reducer comprising a second worm coupled to a second motor and a second worm wheel which rotates by being meshed with the second worm; and
   a screw shaft on which the first reducer is mounted on one side and the second reducer is mounted on the other side,
   wherein an angle at which the first reducer and the second reducer are mounted to the screw shaft is set to an offset angle, and
   wherein the offset angle represents a degree of angle at which a center of a tooth provided in the first worm wheel does not coincide with a center of the corresponding tooth provided in the second worm wheel, so that the first worm wheel and the second worm wheel do not simultaneously mesh with the first worm and the second worm, respectively.

2. The steering apparatus of claim 1, wherein the offset angle is an angle between a center of a tooth groove between two adjacent gear teeth of the first worm wheel and a center of a tooth groove of the second worm wheel provided in an area opposite to one of the two adjacent gear teeth, with respect to an axis of the screw shaft.

3. The steering apparatus of claim 2, wherein the offset angle is determined based on the number of gear teeth of the first worm wheel or the number of gear teeth of the second worm wheel.

4. The steering apparatus of claim 2, wherein the offset angle is determined by an equation that, the offset angle ($\theta$)=(a first constant*a second constant)/(the number of gear teeth of the first worm wheel or the number of gear teeth of the second worm wheel).

5. The steering apparatus of claim 4, wherein the first constant is 360, and the second constant is 0.5.

6. The steering apparatus of claim 1, further comprising a sector shaft which is connected to the screw shaft and rotates according to a rotation of the screw shaft.

7. An assembly method of a steering apparatus comprising:
   determining an offset angle at which first reducer including a first worm coupled to a first motor and a first worm wheel meshing with the first worm to rotate and second reducer including a second worm coupled to a second motor and a second worm wheel meshed with the second worm to rotate are to be mounted on a screw shaft; and
   mounting the first reducer and the second reducer on one side and the other side of the screw shaft according to an offset angle,
   wherein the offset angle represents a degree of angle at which a center of a tooth provided in the first worm wheel does not coincide with a center of the corresponding tooth provided in the second worm wheel, so that the first worm wheel and the second worm wheel do not simultaneously mesh with the first worm and the second worm, respectively.

8. The assembly method of claim 7, wherein, in the mounting the first reducer and the second reducer on one side and the other side of the screw shaft, the offset angle is determined as an angle between a center of a tooth groove between two adjacent gear teeth of the first worm wheel and a center of a tooth groove of the second worm wheel provided in an area opposite to one of the two adjacent gear teeth, with respect to an axis of the screw shaft.

9. The assembly method of claim 8, wherein, in the mounting the first reducer and the second reducer on one side and the other side of the screw shaft, the offset angle is determined based on the number of gear teeth of the first worm wheel or the number of gear teeth of the second worm wheel.

10. The assembly method of claim 8, wherein, in the mounting the first reducer and the second reducer on one side and the other side of the screw shaft, the offset angle is determined by an equation that, the offset angle (θ)=(a first constant*a second constant)/(the number of gear teeth of the first worm wheel or the number of gear teeth of the second worm wheel).

11. The assembly method of claim 10, wherein the first constant is 360, and the second constant is 0.5.

\* \* \* \* \*